US011981824B2

(12) United States Patent
Mizoguchi et al.

(10) Patent No.: US 11,981,824 B2
(45) Date of Patent: *May 14, 2024

(54) PHOTOCURABLE COMPOSITION FOR SUPPORT MATERIALS FOR INKJET 3D PRINTERS, INK, CARTRIDGE, METHOD FOR PRODUCING SUPPORT MATERIAL, AND METHOD FOR PRODUCING OPTICALLY SHAPED ARTICLE

(71) Applicant: NIPPON SHOKUBAI CO., LTD., Osaka (JP)

(72) Inventors: Hirotaka Mizoguchi, Suita (JP); Yasunori Tsujino, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/977,141

(22) PCT Filed: Feb. 26, 2019

(86) PCT No.: PCT/JP2019/007332
§ 371 (c)(1),
(2) Date: Sep. 1, 2020

(87) PCT Pub. No.: WO2019/167948
PCT Pub. Date: Sep. 6, 2019

(65) Prior Publication Data
US 2021/0047530 A1 Feb. 18, 2021

(30) Foreign Application Priority Data
Mar. 2, 2018 (JP) .................. 2018-037590

(51) Int. Cl.
*C09D 11/30* (2014.01)
*B29C 64/112* (2017.01)
*B29C 64/40* (2017.01)
*B29K 33/00* (2006.01)
*B33Y 10/00* (2015.01)
*B33Y 70/00* (2020.01)
*B41J 2/175* (2006.01)
*C09D 11/101* (2014.01)
*C09D 11/107* (2014.01)

(52) U.S. Cl.
CPC .......... *C09D 11/30* (2013.01); *B29C 64/112* (2017.08); *B29C 64/40* (2017.08); *B33Y 10/00* (2014.12); *B33Y 70/00* (2014.12); *B41J 2/17503* (2013.01); *C09D 11/101* (2013.01); *C09D 11/107* (2013.01); *B29K 2033/00* (2013.01)

(58) Field of Classification Search
CPC ..... C09D 11/30; C09D 11/101; C09D 11/107; B29C 64/112; B29C 64/40; B33Y 10/00; B33Y 70/00; B41J 2/17503; B29K 2033/00
See application file for complete search history.

(56) References Cited

U.S. PATENT DOCUMENTS

| 2,956,046 A | 10/1960 | Glavis et al. |
| 3,058,958 A | 10/1962 | Glavis |
| 10,584,194 B2 | 3/2020 | Iwata et al. |
| 2004/0135292 A1 | 7/2004 | Coats et al. |
| 2005/0218549 A1* | 10/2005 | Farr ............ G03F 7/0047 425/375 |
| 2006/0023042 A1 | 2/2006 | Doi |
| 2013/0234370 A1 | 9/2013 | Suzuki et al. |
| 2017/0369607 A1 | 12/2017 | Iwata et al. |
| 2018/0291219 A1 | 10/2018 | Kiyosada |
| 2019/0002617 A1 | 1/2019 | Kotani |
| 2019/0241684 A1 | 8/2019 | Tsujino et al. |
| 2019/0241691 A1 | 8/2019 | Kito et al. |
| 2020/0062877 A1 | 2/2020 | Knopf et al. |
| 2020/0181303 A1* | 6/2020 | Xu ............ C08F 220/282 |
| 2020/0198234 A1* | 6/2020 | Kuster ............ B29C 64/393 |
| 2020/0338833 A1* | 10/2020 | Chen ............ B29C 64/112 |
| 2020/0407581 A1* | 12/2020 | Kito ............ B33Y 70/00 |
| 2021/0395563 A1* | 12/2021 | McGrail ............ B29C 64/124 |

FOREIGN PATENT DOCUMENTS

| CN | 104908320 A | 9/2015 |
| CN | 109641395 A | 4/2019 |
| EP | 3 251 818 A1 | 12/2017 |
| EP | 3 254 835 A1 | 12/2017 |
| JP | 2009-102527 A | 5/2009 |
| JP | 2010-89432 A | 4/2010 |

(Continued)

OTHER PUBLICATIONS

Extended (Supplementary) European Search Report dated Nov. 5, 2021, issued in counterpart EP Application No. 19760695.7. (7 pages).

(Continued)

*Primary Examiner* — Michael M. Robinson
(74) *Attorney, Agent, or Firm* — WHDA, LLP

(57) ABSTRACT

In the present invention, a photocurable composition for a support material for an inkjet 3D printer comprises a water-soluble ethylenically unsaturated monomer containing an ionic group and a counter ion, and a water content is not more than 10 mass % in 100 mass % of the photocurable composition for a support material. It is preferably that the photocurable composition for a support material for an inkjet 3D printer further comprises a photopolymerization initiator.

15 Claims, No Drawings

(56) References Cited

FOREIGN PATENT DOCUMENTS

| JP | 2012-111226 A | 6/2012 |
|---|---|---|
| JP | 2016-2704 A | 1/2016 |
| JP | 2018-2768 A | 1/2018 |
| WO | 2016/121587 A1 | 8/2016 |
| WO | 2017222025 A1 | 12/2017 |

OTHER PUBLICATIONS

International Search Report dated May 14, 2019, issued in counterpart application No. PCT/JP2019/007332 (1 page).
Office Action dated May 24, 2022, issued in counterpart CN application No. 201980008676.6, with English translation. (72 pages).
International Search Report dated Oct. 10, 2017, issued in International Application No. PCT/JP2017/031210 (counterpart to U.S. Appl. No. 16/328,95). (1 page).
Final Office Action dated Nov. 24, 2021, issued in U.S. Appl. No. 16/328,950 (15 pages).
Non-Final Office Action dated Apr. 5, 2021, issued in U.S. Appl. No. 16/328,950 (13 pages).
Non-Final Office Action dated Aug. 10, 2022, issued in U.S. Appl. No. 16/328,950 (13 pages).

\* cited by examiner

PHOTOCURABLE COMPOSITION FOR SUPPORT MATERIALS FOR INKJET 3D PRINTERS, INK, CARTRIDGE, METHOD FOR PRODUCING SUPPORT MATERIAL, AND METHOD FOR PRODUCING OPTICALLY SHAPED ARTICLE

FIELD

The present invention relates to a photocurable composition for support materials for inkjet 3D printers, an ink, a cartridge, a method for producing support materials, and a method for producing optically shaped articles.

BACKGROUND

In recent years, optically fabrication methods which are based on inkjet methods have been proposed. In the methods, liquid photocurable resins that come out of inkjet nozzles are cured and stacked to be photomolded. Inks for inkjet 3D printers used in these optically fabrication methods include model materials constituting molded bodies by photocuring with UV or the like, and support materials used as materials supporting the model materials upon stacking the model materials three-dimensionally. By stacking the layers of the model materials on the support materials, overhang structures or hollow structures can be formed.

Patent Literature 1 describes a 3D molding ink set containing a 3D molding composition liquid and a support material composition liquid. The 3D molding composition liquid contains at least two kinds of monofunctional monomers having an ethylene polymerizable group and a photoinitiator. As the monofunctional monomers, monofunctional monomers having ionic groups and monofunctional monomers having no ionic group are contained. The 3D molding composition liquid further contains counter ions to the ionic groups. It is described that the above-mentioned 3D molding composition liquid can be cured with ultraviolet irradiation, and furthermore, can provide 3D shaped articles which have high toughness, and are not easily broken.

The support materials are required to have enough hardness (supportability) to withstand stacking layers. After curing, the support materials are removed from the model materials by water dissolution, heating, chemical reaction, hydraulic washing, electromagnetic wave irradiation, differential thermal expansion or the like. Therefore, it is also required that photocurable compositions for the support materials for inkjet 3D printers can be easily removed from the model materials after curing.

Patent Literature 2 describes a support material for supporting a shape during optically fabricating of an optically shaped article in an inkjet optically fabrication method. The support material comprises 5 to 40 parts by weight of N-hydroxyethylacrylamide and 95 to 60 parts by weight of PPG. Although the above-mentioned support material is excellent in water solubility, there is a problem that the hardness of the cured product is low.

CITATION LIST

Patent Literature

[Patent Literature 1] Japanese Unexamined Patent Application Publication No. 2016-2704
[Patent Literature 2] Japanese Unexamined Patent Application Publication No. 2012-111226

SUMMARY

Technical Problem

Accordingly, the object of the present invention is to provide a photocurable composition for support materials for inkjet 3D printers, an ink, a cartridge, a method for producing support materials, and a method for producing optically shaped articles, in which the composition has excellent curability and sufficient hardness of the cured product, and has excellent solubility in the solvent after curing.

Solution to Problem

The inventors have intensively studied to solve the above-mentioned problems. As a result, they found that, in a composition comprising a watersoluble ethylenically unsaturated monomer containing an ionic group and a counter ion, by making a water content of the composition be a specific amount or less, the photocurable composition for support materials for inkjet 3D printers which has excellent curability and sufficient hardness of the cured product, and has excellent solubility in the solvent after curing, an ink and a cartridge each containing the composition, a method for producing the support materials, and a method for producing optically shaped articles by using the support materials, can be obtained. Then finally, they have completed the present invention.

In the present invention, a photocurable composition for a support material for an inkjet 3D printer contains a water-soluble ethylenically unsaturated monomer containing an ionic group and a counter ion, and a water content is not more than 10 mass % in 100 mass % of the photocurable composition for a support material.

Preferably, the photocurable composition for a support material for an inkjet 3D printer further comprises a photopolymerization initiator.

Further, in an ink for an inkjet 3D printer of the present invention, the ink comprises either of the photocurable compositions for a support material for an inkjet 3D printer.

Further, in a cartridge for an inkjet 3D printer of the present invention, the cartridge is filled with the ink for an inkjet 3D printer.

Further, in a method for producing a support material of the present invention, the support material is formed by using the photocurable composition for a support material for an inkjet 3D printer or the ink for an inkjet 3D printer.

Further, in a method for producing an optically shaped article of the present invention, either of the photocurable compositions for a support material for an inkjet 3D printer or the ink for an inkjet 3D printer is used, and the method comprises: a step for forming a support material by using the photocurable composition for a support material for an inkjet 3D printer or the ink for an inkjet 3D printer; a step for forming a model material; and a step for removing the support material.

According to the present invention, the photocurable composition for a support material for an inkjet 3D printer having excellent curability and sufficient hardness of the cured product, and having excellent solubility in the solvent after curing, the ink and the cartridge containing the composition, the method for producing the support material, and the method for producing an optically shaped article using the support material, can be provided.

[Photocurable Composition for Support Material for Inkjet 3D Printer]

A photocurable composition for support materials for inkjet 3D printers of the present invention (hereinafter sometimes simply referred to as the photocurable composition for support materials) contains water-soluble ethylenically unsaturated monomers that contain ionic groups and counter ions and has a water content of not more than 10 mass %, preferably less than 10 mass %, more preferably not more than 5 mass %, further preferably not more than 3 mass %, in 100 mass % of the photocurable composition for support materials. A lower limit of the water content is preferably 0 mass %. In the present invention, the photocurable composition for support materials has excellent curability and sufficient hardness of the cured product, and has excellent solubility in the solvent after curing. The water content in the photocurable composition for support materials can be obtained by calculating the total content of water contained in compounds used as raw materials, or with Karl Fischer measurement.

1. Water-Soluble Ethylenically Unsaturated Monomer

The water-soluble ethylenically unsaturated monomers contained in the photocurable composition for support materials of the present invention are the monomers having one or more ethylenically unsaturated groups in a molecule. They are also the monomers having high water solubility by containing ionic groups and counter ions.

Examples of the ethylenically unsaturated groups include ethylene group, propenyl group, butenyl group, vinylphenyl group, (meth) acryl group, allyl ether group, vinyl ether group, maleyl group, maleimide group, (meth) acrylamide group, acetyl vinyl group, vinylamide group and the like. In the present specification, "(meth) acryl" means both of "acryl" and "methacryl" or either of them, "(meth) acrylate" means both of "acrylate" and "methacrylate" or either of them. Among them, (meth) acryl group, vinyl ether group or (meth) acrylamide group is preferable, and (meth) acryl group is more preferable.

Examples of the ionic groups include carboxylic acids, phosphoric acids, sulfonic acids and the like. Among them, carboxylic acids are preferable.

Examples of the counter ions include: monovalent counter ions such as sodium ion, potassium ion, and ammonium ion; and polyvalent metal ions such as zinc ion, magnesium ion, calcium ion, aluminum ion and neodymium ion. Among them, the monovalent counter ions are preferable, and sodium ion, potassium ion or ammonium ion is more preferably used, and potassium ion is further preferably used. With the monovalent counter ions, it is also preferable to use the polyvalent metal ions such as zinc ion, magnesium ion, calcium ion, aluminum ion and neodymium ion.

When the water-soluble ethylenically unsaturated monomers containing the monovalent counter ions as the counter ions and the water-soluble ethylenically unsaturated monomers containing polyvalent metal ions as the counter ions are used together, it is possible to further improve supportability of the cured product obtained by photocuring the photocurable composition for support materials for inkjet 3D printers. It is preferred embodiments of the present invention to further use below-mentioned organic acids and/or salts thereof together with the above-mentioned monomers. Preferable examples of the polyvalent metal ions are zinc ion, magnesium ion and calcium ion.

A content of the water-soluble ethylenically unsaturated monomers containing the ionic groups and the counter ions included in the photocurable composition for support materials for inkjet 3D printers according to the present invention is preferably not more than 50 mass %, more preferably not more than 40 mass %, further preferably not more than 30 mass % as an upper limit, and preferably not less than 1 mass %, more preferably not less than 5 mass %, further preferably not less than 10 mass % as a lower limit, in 100 mass % of the above composition. In this case, supportability of the photocurable composition for support materials for inkjet 3D printers can be further improved.

A total content of the water-soluble ethylenically unsaturated monomers containing the monovalent counter ions as the counter ions and the water-soluble ethylenically unsaturated monomers containing the polyvalent metal ions as the counter ions is preferably not more than 50 mass %, more preferably not more than 40 mass %, and further preferably not more than 30 mass % as an upper limit, and a lower limit is preferably not less than 1 mass %, more preferably not less than 5 mass %, and further preferably not less than 10 mass %, in 100 mass % of the photocurable composition for support materials for inkjet 3D printers.

A content of the water-soluble ethylenically unsaturated monomers containing the monovalent counter ions as the counter ions is preferably not more than 50 mass %, more preferably not more than 40 mass %, and further preferably not more than 30 mass % as an upper limit, and a lower limit is preferably not less than 1 mass %, more preferably not less than 5 mass %, and further preferably not less than 10 mass %, in 100 mass % of the photocurable composition for support materials for inkjet 3D printers.

A content of the water-soluble ethylenically unsaturated monomers containing the polyvalent metal ions as the counter ions is preferably not more than 15 mass %, more preferably not more than 10 mass % as an upper limit, and preferably not less than 0.5 mass %, more preferably not less than 1 mass % as a lower limit, in 100 mass % of the photocurable composition for support materials for inkjet 3D printers.

In this case, supportability of the photocurable composition for support materials for inkjet 3D printers can be further improved, and solubility of the composition can be also further improved.

In the photocurable composition for support materials for inkjet 3D printers according to the present invention, examples of the water-soluble ethylenically unsaturated monomers containing carboxylic acids as the ionic groups and containing the counter ions include: monovalent salts such as alkali metal salts, for example, sodium salts and potassium salts, and ammonium salts; polyvalent salts such as zinc salts, magnesium salts, calcium salts, aluminum salts, and neodymium salts; and the like, of acrylic acid, methacrylic acid, maleic acid, fumaric acid, 2-(meth) acryloyloxybenzoic acid, 3-(meth) acryloyloxybenzoic acid, 4-(meth) acryloyloxybenzoic acid, 2-(meth) acryloyloxyethylhexahydrophthalic acid, 2-(meth) acryloyloxyethylphthalic acid, 2-(meth) acryloyloxyethylsuccinic acid, 2-vinylbenzoic acid, 3-vinylbenzoic acid, 4-vinylbenzoic acid, N-(meth) acryloylaspartic acid, ω-(meth) acroylalkane-1,1 dicarboxylic acids or the like.

Among them, the monovalent salts such as the alkali metal salts, for example, the sodium salts and the potassium salts, and the ammonium salts are preferable. The sodium salts, the potassium salts or the ammonium salts are more preferable. The potassium salts are further preferable.

When the monovalent salts and the polyvalent metal salts of the carboxylic acids are used together, supportability of the cured product obtained by photocuring the photocurable composition for support materials for inkjet 3D printers can be further improved. Further, it is preferred embodiments of the present invention to further use the below-described organic acids and/or the salts thereof with the above-mentioned monomers. The zinc salts, the magnesium salts or the calcium salts are preferable as the polyvalent metal salts of the carboxylic acids.

A total content of the monovalent salts and the polyvalent metal salts of the carboxylic acids is preferably not more than 50 mass %, more preferably not more than 40 mass %, further preferably not more than 30 mass % as an upper limit, and preferably not less than 1 mass %, more preferably not less than 5 mass %, further preferably not less than 10 mass % as a lower limit, in 100 mass % of the photocurable composition for support materials for inkjet 3D printers.

A content of the monovalent salts of the carboxylic acids is preferably not more than 50 mass %, more preferably not more than 40 mass %, further preferably not more than 30 mass % as an upper limit, and preferably not less than 1 mass %, more preferably not less than 5 mass %, further preferably not less than 10 mass % as a lower limit, in 100 mass % of the photocurable composition for support materials for inkjet 3D printers.

A content of the polyvalent metal salts of the carboxylic acids is preferably not more than 15 mass %, more preferably not more than 10 mass % as an upper limit, and preferably not less than 0.5 mass %, more preferably not less than 1 mass % as a lower limit, in 100 mass % of the photocurable composition for support materials for inkjet 3D printers.

In this case, supportability of the photocurable composition for support materials for inkjet 3D printers can be further improved, and solubility of the composition can be also further improved.

Preferable examples of the water-soluble ethylenically unsaturated monomers containing the carboxylic acids as the ionic groups and containing the counter ions include sodium salts, potassium salts, zinc salts and calcium salts having from 3 to 15 carbon atoms in the carboxylic acids. Sodium salts, potassium salts, zinc salts or calcium salts having from 3 to 12 carbon atoms are more preferable. The number of carbon atoms is more preferably from 3 to 9, further preferably from 3 to 6. Among them, potassium (meth) acrylate, sodium (meth) acrylate, zinc (meth) acrylate or calcium (meth) acrylate is particularly preferable. By using monomers having a small number of carbon atoms, hydrophobic portions in the molecule can be made small, and water solubility of the water-soluble ethylenically unsaturated monomers can be further enhanced.

In the photocurable composition for support materials for inkjet 3D printers according to the present invention, examples of the water-soluble ethylenically unsaturated monomers containing the phosphoric acids as the ionic groups and containing the counter ions include sodium salts, potassium salts and ammonium salts, for example of mono (2-acryloyloxyethyl) acid phosphate, mono (2-methacryloyloxyethyl) acid phosphate, diphenyl (2-acryloyloxyethyl) phosphate, diphenyl (2-methacryloyloxyethyl) phosphate, phenyl (2-acryloyloxyethyl) phosphate, acid phosphoxyethyl methacrylate, methacroyloxyethyl acid phosphate, phosphoxy polyoxyethyleneglycol monomethacrylate, acid phosphoxy polyoxy propyleneglycol methacrylate, (meth) acryloyloxyethyl acid phosphate, (meth) acryloyloxypropyl acid phosphate, (meth) acryloyloxy-2-hydroxypropyl acid phosphate, (meth) acryloyloxy-3-hydroxyp ropyl acid phosphate, (meth) acryloyloxy-3-chloro-2-hydroxypropyl acid phosphate, and compounds having phosphono groups in a molecule such as vinylphosphoric acid and p-vinylbenzenephosphoric acid.

In the photocurable composition for support materials for inkjet 3D printers according to the present invention, examples of the water-soluble ethylenically unsaturated monomers containing the sulfonic acids as the ionic groups and containing the counter ions include sodium salts, potassium salts and ammonium salts of compounds such as allylsulfonic acid, isoprene sulfonic acid, 2-(meth) acrylamide ethylsulfonic acid, 3-(meth) acrylamide propylsulfonic acid, 4-(meth) acrylamide butylsulfonic acid, 2-(meth) acrylamide-2-methylpropanesulfonic acid, p-vinylbenzene sulfonic acid, and vinyl sulfonic acid. The water-soluble ethylenically unsaturated monomers containing the ionic groups and the counter ions as exemplified above can be used alone or in combination of two or more kinds.

As the water-soluble ethylenically unsaturated monomer containing the ionic groups and the counter ions contained in the photocurable composition for support materials for inkjet 3D printers of the present invention, the acrylates (a salt of acrylic acid) are preferable, and the monovalent salts of the acrylic acid such as: the alkali metal salts, for example, the lithium salts, the sodium salts and the potassium salts; the ammonium salts; and the amine salts are more preferable. The alkali metal salts or the ammonium salts are further preferable, and the sodium salts, the potassium salts or the ammonium salts are particularly preferable. The potassium salts are the most preferable.

As the water-soluble ethylenically unsaturated monomers containing the ionic groups and the counter ions contained in the photocurable composition for support materials for inkjet 3D printers of the present invention, with the above, the zinc salts, the magnesium salts, the calcium salts, the aluminum salts, the neodymium salts or the like as the polyvalent metal salts of the acrylic acid can be used. The zinc salts, the magnesium salts or the calcium salts are preferable as the polyvalent metal salts of the acrylic acids.

When the monovalent salts and the polyvalent metal salts of the acrylic acids are used together, supportability of the cured product obtained by photocuring the photocurable composition for support materials for inkjet 3D printers can be further improved. As the combination of using the monovalent salts and the polyvalent metal salts of the acrylic acids together, the combination of the potassium acrylate and the zinc acrylate is preferable. By using zinc acrylate together, a cured product with higher strength can be obtained.

A total content of the monovalent salts and the polyvalent metal salts of the acrylic acids is preferably not more than 50 mass %, more preferably not more than 40 mass %, further preferably not more than 30 mass % as an upper limit, and is preferably not less than 1 mass %, more preferably not less than 5 mass %, further preferably not less than 10 mass % as a lower limit, in 100 mass % of the photocurable composition for support materials for inkjet 3D printers.

Among them, a total content of the potassium acrylate and the zinc acrylate is preferably from 10 to 30 mass % in 100 mass % of the photocurable composition for support materials for inkjet 3D printers. In this case, viscosity of the composition can be further reduced, and a cost can be further suppressed by reducing the amount of the acrylic acids used.

A content of the monovalent metal salts of the acrylic acids is preferably not more than 50 mass %, more preferably not more than 40 mass %, further preferably not more than 30 mass % as an upper limit, and is preferably not less than 1 mass %, more preferably not less than 5 mass %, and further preferably not less than 10 mass % as a lower limit, in 100 mass % of the photocurable composition for support materials for inkjet 3D printers.

A content of the polyvalent metal salts of the acrylic acids is preferably not more than 15 mass % and more preferably not more than 10 mass % as an upper limit, and is preferably not less than 0.5 mass % and more preferably not less than 1 mass % as a lower limit, in 100 mass % of the photocurable composition for support materials for inkjet 3D printers.

In this case, supportability of the photocurable composition for support materials for inkjet 3D printers can be further improved, and solubility of the composition can be also further improved.

2. Other Unsaturated Monomer (Non-Ionic Monomer)

The photocurable composition for support materials for inkjet 3D printers of the present invention may contain unsaturated monomers other than the water soluble ethylenically unsaturated monomers containing the ionic groups and the counter ions. Examples of the other unsaturated monomers include: (meth) acrylic acid; (meth) acrylates such as methyl (meth) acrylate, ethyl (meth) acrylate, propyl (meth) acrylate, butyl (meth) acrylate, 2-ethylhexyl (meth) acrylate, pentyl (meth) acrylate, isoamyl (meth) acrylate, octyl (meth) acrylate, iso-octyl (meth) acrylate, isononyl (meth) acrylate, decyl (meth) acrylate, isodecyl (meth) acrylate, lauryl (meth) acrylate, tridecyl (meth) acrylate, isomyristyl (meth) acrylate, isostearyl (meth) acrylate, n-stearyl (meth) acrylate, cyclohexyl (meth) acrylate, benzyl (meth) acrylate, phenoxyethyl (meth) acrylate, phenoxyethoxyethyl (meth) acrylate, methoxyethyl (meth) acrylate, butoxyethyl (meth) acrylate, tetrahydrofurfuryl (meth) acrylate, isobornyl (meth) acrylate, dicyclopentenyl (meth) acrylate, dicyclopentanyl (meth) acrylate, methoxyethoxyethyl (meth) acrylate, 2-hydroxyethyl (meth) acrylate, 2-hydroxypropyl (meth) acrylate, 2-hydroxybutyl (meth) acrylate, 2-hydroxy-3-phenoxy propyl (meth) acrylate, t-butylcyclohexyl (meth) acrylate, 2-ethylhexyl-diglycol (meth) acrylate, 4-hydroxybutyl (meth) acrylate, methoxytriethyleneglycol (meth) acrylate, ethoxydiethyleneglycol (meth) acrylate, 2-(2-ethoxyethoxy) ethyl (meth) acrylate, 2-cyanoethyl (meth) acrylate, methyl=2-(hydroxymethyl) acrylate and 2-ethylhexylcarbitol (meth) acrylate; allylethers such as phenylallylether, o-, m-, p-cresolmonoallylether, biphenyl-2-olmonoallylether, biphenyl-4-olmonoallylether, butylallylether, cyclohexylallylether and cyclohexanemethanolmonoallylether; vinylethers such as butylvinyl ether, butylpropenylether, butylbutenylether, hexylvinylether, ethylhexylvinylether, phenylvinylether, benzylvinylether, ethylethoxyvinylether, acetylethoxyethoxyvinylether, cyclohexylvinylether and adamantylvinylether; maleimides such as phenylmaleimide, cyclohexylmaleimide and n-hexylmaleimide; monomers having aromatic groups or alicyclic groups such as benzylacrylate, phenoxyethylacrylate, phenoxyethoxyethylacrylate, isobornyl (meth) acrylate, dicyclopentenyl (meth) acrylate, dicyclopentanyl (meth) acrylate, bisphenol A diacrylate, EO adduct of bisphenol A bis (meth) acrylate, PO adduct of bisphenol A bis (meth) acrylate and EO adduct of hydrogenated bisphenol A bis (meth) acrylate; polyoxyalkylenedi (meth) acrylates such as polyoxyethylenedi (meth) acrylate and polyoxypropylenedi (meth) acrylate; acroloylmorpholine; N-vinylpyrrolidone; hydroxyalkyl (meth) acrylate; acrylamides such as (meth) acrylamide, N, N-dimethylacrylamide and N-hydroxyethylacrylamide; and the like.

These may be used alone, or two or more of them may be used in combination.

A content of the other unsaturated monomers in 100 mass % of the composition is preferably not more than 50 mass %, more preferably from 20 to 50 mass % and further preferably from 25 to 45 mass %. It is also preferable that the content of the other unsaturated monomers in 100 mass % of the composition is less than 2 mass %. In such a case, an odor of the photocurable composition for support materials for inkjet 3D printers can be further suppressed.

3. Organic Acid and/or Salt Thereof

The photocurable composition for support materials for inkjet 3D printers of the present invention may comprise organic acids and/or salts thereof. The organic acids and/or salts thereof are compounds other than the water-soluble ethylenically unsaturated monomers and the other unsaturated monomers.

Examples of the organic acids include organic sulfonic acids such as p-toluenesulfonic acid; organic phosphoric acids such as phenylphosphonic acid; organic carboxylic acids; and phosphoric esters. Among them, the organic carboxylic acids are preferable. Examples of the organic carboxylic acids include aliphatic carboxylic acids and aromatic carboxylic acids. Examples of the aliphatic carboxylic acids include formic acid, acetic acid, propionic acid, butyric acid, valeric acid, hexanoic acid, heptanoic acid, octanoic acid, octylic acid, nonanoic acid, decanoic acid, lauric acid, myristic acid, palmitic acid, stearic acid, behenic acid, tridecanoic acid, pentadecanoic acid, heptadecanoic acid, lactic acid, malic acid, citric acid, oxalic acid, malonic acid, succinic acid, fumaric acid, maleic acid, adipic acid, benzoic acid, glycine, polyacrylic acid and polylactic acid. Examples of the aromatic carboxylic acids include benzoic acid, phthalic acid and salicylic acid. Among them, the aliphatic carboxylic acids are more preferable, and lactic acid, propionic acid or polyacrylic acid is further preferable.

Examples of the salts of the organic acids include metal carboxylates. Examples of metals of the metal carboxylates include alkali metals such as lithium, sodium and potassium; alkaline earth metals such as magnesium, calcium, strontium and barium; zinc; and zirconium. Among them, the alkali metals such as potassium are preferable. As the salts of the organic acids, potassium lactate or potassium propionate is preferable.

When the photocurable composition for support materials for inkjet 3D printers of the present invention comprises the organic acids and/or salts thereof, storage stability is further improved.

A content of the organic acids and/or salts thereof is preferably not more than 60 mass %, more preferably not more than 50 mass %, further preferably not more than 40 mass % as an upper limit, and as a lower limit, preferably not less than 1 mass %, more preferably not less than 5 mass %, further preferably not less than 10 mass %, in 100 mass % of the photocurable composition for support materials for inkjet 3D printers, and in a range where the water content is not more than 10 mass %. In the case mentioned above, storage stability as well as the supportability/solubility of the photocurable composition for support materials for inkjet 3D printers can be further improved.

4. Solvents

The photocurable composition for support materials of the present invention may contain solvents. Examples of the solvents include: water; monovalent-alcohols such as methanol, ethanol, and propanol; and glycols such as ethylene glycol, propylene glycol, diethylene glycol, dipropylene glycol, triethylene glycol, polyethylene glycol, polypropylene glycol, glycerol, and alkylene oxide adducts containing oxypropylene groups, for example, polyoxypropylene glycol. These solvents may be used alone, or two or more of them may be used in combination.

The solvents are used in a range where the water content is not more than 10 mass % in 100 mass % of the present photocurable composition for support materials for inkjet 3D printers. As the solvents, glycols having from 2 to 6 carbon atoms are preferable, ethylene glycol, propylene glycol, diethylene glycol, or glycerol is more preferable, and diethylene glycol is particularly preferable.

A content of the solvents, is preferably not less than 5 mass %, more preferably not less than 10 mass %, further preferably not less than 15 mass % as a lower limit, and is preferably not more than 90 mass %, more preferably not more than 75 mass %, further preferably not more than 74 mass %, particularly preferably not more than 60 mass % as an upper limit, in 100 mass % of the composition. Here, the content of the water is not more than 10 mass %.

A content of the glycols having from 2 to 6 carbon atoms in 100 mass % of the composition is preferably from 30 to 90 mass %, more preferably from 40 to 90 mass %, further preferably from 50 to 90 mass %, further more preferably from 55 to 90 mass %, particularly preferably 70 to 90 mass %.

Among them, a content of diethylene glycol in 100 mass % of the composition is preferably from 30 to 90 mass %, more preferably from 40 to 90 mass %, further preferably from 55 to 90 mass %, particularly preferably from 70 to 90 mass %.

5. Photopolymerization Initiator

The photocurable composition for support materials for inkjet 3D printers of the present invention preferably comprises photopolymerization initiators. Examples of the photopolymerization initiators include: benzoin compounds such as benzoin, benzoin methyl ether, benzoin ethyl ether, benzoin propyl ether and benzoin isobutyl ether; acetophenone compounds such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenylketone and 2-methyl-1-[4-(methylthio) phenyl]-2-morpholino propane-1-one; anthraquinone compounds such as 2-ethylanthraquinone, 2-t-butyl anthraquinone, 2-chloroanthraquinone and 2-amylanthraquinone; thioxanthone compounds such as 2,4-diethylthioxanthone, 2-isopropylthioxanthone, 2-chlorothioxanthone, and [3-(3,4-dimethyl-9-oxothioxanthen-2-yl) oxy-2-hydroxypropyl]-trimethyl azanium chloride; ketal compounds such as acetophenone dimethyl ketal and benzyl dimethyl ketal; benzophenone compounds such as benzophenone, 4-benzoyl-4'-methyl diphenyl sulfide and 4,4'-bismethyl aminobenzophenone; phosphine oxides such as 2,4,6-trimethylbenzoyldiphenylphosphine oxide, bis-(2,6-dimethoxybenzoyl)-2,4,4-trimethylpentylphosphine oxide and bis(2,4,6-trimethylbenzoyl)-phenyl phosphine oxide; and mixtures thereof.

These may be used alone, or two or more of them may be used in combination.

A content of the photopolymerization initiators is preferably from 0.05 to 10.0 mass %, more preferably from 0.05 to 7.0 mass %, from 0.1 to 7.0 mass %, further preferably from 0.1 to 5.0 mass %, particularly preferably from 0.2 to 5.0 mass %, in 100 mass % of the composition.

6. Additives

In the photocurable composition for support materials of the present invention, other additives can be contained as required within a range not hindering the effects of the present invention. Specific examples thereof include photopolymerizing initiation aids, polymerization inhibitors, surfactants, coloring agents, antioxidants, chain transfer agents, and fillers.

Examples of the photopolymerizing initiation aids include tertiary amine compounds such as N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine.

Examples of the polymerization inhibitors include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutyl cresol, cyclohexanone oxime cresol, guaiacol, o-isopropyl phenol, butyraldoxime, methylethyl ketoxime, and cyclohexanone oxime.

Examples of the surfactants include: nonionic surfactants such as 1 to 40 mol of ethylene oxide (hereinafter abbreviated to EO) adducts of phenol, 1 to 40 mol of EO adducts of stearic acid, 1 to 40 mol of EO adducts of higher alcohols, sorbitan palmitic acid monoester, sorbitan stearic acid monoester, and sorbitan stearic acid triester; anionic surfactants such as linear alkyl benzene sulfonate salts (LAS), alkyl sulfate salts (AS), secondary alkane sulfonate salts (SAS), polyoxyethylene alkyl ether sulfate salts (AES), α-olefin sulfonate salts (AOS), α-sulfo fatty acid ester salts (α-SF), and polyoxyethylene alkyl ether carboxylate salts; cationic surfactants such as alkyltrimethyl ammonium salts, and dialkyldimethyl ammonium salts; amphoteric surfactants such as alkylamino fatty acid salts and alkylbetaines; fluorine-containing surfactants such as perfluoroalkyl EO 1 to 50 mol adducts, perfluoroalkyl carboxylates, and perfluoroalkyl betaines; and modified silicone oils such as polyether-modified silicone oils, and (meth) acrylate-modified silicone oils.

Examples of the coloring agents include toluidine red, permanent carmine FB, fast yellow G, disazoyellow AAA, disazoorange PMP, soluble azopigments, condensed azopigments, chelate azopigments, phthalocyanine blue, indanthrone blue, quinacridone red, dioxazine violet, basic dyes, acid dyes, aniline black, daylight fluorescent pigments, nitroso pigments, nitro pigments, natural pigments, metal oxides as inorganic pigments, and carbon black.

Examples of the antioxidants include 1,3,5-trimethyl-2,4,6-tris(3,5-di-t-butyl-4-hydroxybenzyl) benzene, dilauryl 3,3'-thiodipropionate, triphenyl phosphite, octylated diphenylamine, 2,6-di-t-butyl-p-cresol, and 2,2'-methylenebis (4-methyl-6-t-butylphenol).

Examples of the chain transfer agents include hydroquinone, diethylmethylamine, diphenylamine, diethyl disulfide, di-1-octyl disulfide, toluene, xylene, 1-butene, 1-nonene, dichloromethane, carbon tetrachloride, methanol, 1-butanol, ethylthiol, 1-octylthiol, acetone, methylethylketone, 2-methyl-2-propyl aldehyde, 1-pentyl aldehyde, phenol, m-cresol, p-cresol, and o-cresol.

Examples of the fillers include alumina powder, silica powder, talc, mica, clay, aluminum hydroxide, calcium carbonate, calcium silicate, aluminum powder, copper powder, carbon fiber, glass fiber, cotton fiber, nylon fiber, acrylic fiber, rayon fiber, microballoon, carbon black, metal sulfides, and wood powder.

These additives may be used alone or in combination of two or more kinds.

A content of the additives is preferably from 0.05 to 30 mass %, more preferably from 0.05 to 20 mass %, in 100 mass % of the composition.

The photocurable composition for support materials of the present invention can be prepared by using the above-mentioned various components, and its preparation methods and conditions are not particularly limited. Examples of the preparation methods include methods of stirring and mixing with stirring and mixing devices such as general stirring blades, ultrasonic homogenizers, high-speed homogenizers, high-pressure homogenizers, planetary stirring devices, three-roll mills, ball mills, kitty mills, disk mills, pin mills, and Dyno-mills. After preparing solutions, filtration may be carried out using various filters.

7. Appearance of Photocurable Composition for Support Material

In the photocurable composition for support materials of the present invention, its appearance is uniform and further, is preferably transparent.

8. Odor of Photocurable Composition for Support Material

The photocurable composition for support materials of the present invention preferably has suppressed odor. Specifically, it is preferable that the irritating odor by the monomers is slight, and it is more preferable that there is no irritating odor by the monomers. In the photocurable composition for support materials of the present invention, a content of the unsaturated monomer other than the water-soluble ethylenically unsaturated monomer is preferably less than 2 mass % in 100 mass % of photocurable composition for support materials. In that case, the odor can be more effectively suppressed.

9. Curability of Photocurable Composition for Support Material

The photocurable composition for support materials of the present invention is preferably excellent in curability. On the curability, the composition is preferably cured by irradiation with light of 100 to 2000 $mJ/cm^2$, more preferably cured by irradiation with light of 100 to 1000 $mJ/cm^2$, and further preferably cured by irradiation with light of 100 to 600 $mJ/cm^2$. Here, "cured" means that the composition is no longer in liquid states and lose fluidity.

10. Water Solubility of Cured Product after Curing of Photocurable Composition for Support Material Since the cured product after curing the photocurable composition for support materials of the present invention is used as a support material, water solubility of the cured product is excellent as essential requirements of the support material. In the water solubility, for example, when 0.5 g (surface area 4 $cm^2$) of the cured product is placed on a metal gauze and immersed in 100 g of water at room temperature (for example, around 25° C.), the cured product can dissolve in the water preferably within 2 hours, more preferably, the cured product can almost dissolve in the water within 1 hour, and further preferably, the cured product can dissolve in the water within 1 hour and insoluble matters are not visually observed.

11. Supportability

Supportability (ability to support) in the present invention is a performance of the cured product of the photocurable composition for support materials to support cured products of model materials, and can be represented by hardness (Shore E) of the cured product of the support material measured with a method described below.

In the photocurable composition for support materials of the present invention, a content of the water is not more than 10 mass % in 100 mass % of the photocurable composition for support materials, and then, the supportability can be improved.

The photocurable composition for support materials for inkjet 3D printers of the present invention preferably comprises from 10 to 35 mass % of the water-soluble ethylenically unsaturated monomers containing the ionic groups and the counter ions, from 45 to 90 mass % of glycol, and more preferably, the composition comprises from 10 to 35 mass % of the water-soluble ethylenically unsaturated monomers containing the ionic groups and the counter ions, from 45 to 90 mass % of glycol, and from 0.05 to 10.0 mass % of the photopolymerization initiators.

Further, it is preferable that the composition comprises from 10 to 30 mass % of the water-soluble ethylenically unsaturated monomers containing the ionic groups and the counter ions, from 70 to 90 mass % of diethylene glycol, and particularly preferably, the composition comprises from 10 to 30 mass % of the water-soluble ethylenically unsaturated monomers containing the ionic groups and the counter ions, from 70 to 90 mass % of diethylene glycol, and from 0.05 to 10.0 mass % of the photopolymerization initiators.

[Ink for Inkjet 3D Printer]

An ink for inkjet 3D printers according to the present invention at least contains any of the above-mentioned photocurable compositions for support materials for inkjet 3D printers. The photocurable composition for support materials for inkjet 3D printers comprised in the ink for inkjet 3D printers may be diluted with media.

The photocurable composition for support materials for inkjet 3D printers can be used without modification (or directly) as the ink for inkjet 3D printers. On the other hand, the ink for inkjet 3D printers according to the present invention can be produced by mixing the media with the photocurable composition for support materials for inkjet 3D printers. As the media, hydrophilic media are preferable. In this case, a water content is preferably not more than 10 mass % in 100 mass % of the ink for inkjet 3D printers.

The ink for inkjet 3D printers may contain other additives as necessary within a range not harmful to the effect of the present invention. Examples of the other additives include known additives such as emulsion stabilizers, penetration accelerators, ultraviolet absorbers, preservatives, fungicides, rust inhibitors, pH adjusters, surface tension regulators, defoaming agents, viscosity modifiers, dispersing agents, dispersion stabilizers, chelating agents, drying inhibitors (wetting agents), coloring agents, anti-fading agents, specific resistance adjusting agents, film regulators, antioxidants, and surfactants. These various additives can be added, for example, directly to the ink liquids.

In 100 mass % of the ink for inkjet 3D printers according to the present invention, a content of the photocurable compositions for support materials for inkjet 3D printers is preferably not less than 50 mass %, more preferably not less than 60 mass %, further preferably not less than 70 mass % as a lower limit, and preferably not more than 100 mass % as an upper limit.

In the ink for inkjet 3D printers, viscosity at 25° C. is preferably from 5 to 300 mPa·s, and surface tension is preferably from 25 to 70 mN/m.

[Cartridge for Inkjet 3D Printer]

A cartridge for inkjet 3D printers according to the present invention is filled with the above-mentioned inks for inkjet 3D printers. Well-known cartridge forms may be used as forms of the cartridges for inkjet 3D printers of the present invention as long as the cartridges for inkjet 3D printers are filled with the inks for inkjet 3D printers.

[Method for Producing Support Material]

In a method for producing support materials according to the present invention, support materials are produced by using any one of the above-described photocurable compositions for support materials for inkjet 3D printers or the above-described inks for inkjet 3D printers. The method for producing support materials of the present invention is not particularly limited, as long as the above inks for inkjet 3D printers are used in the method for producing support materials. Known methods such as molding the inks by ejecting from nozzles, printing or the like, and curing the molded inks with irradiating ultraviolet rays of about 100 mJ/cm$^2$ to 1500 mJ/cm$^2$, can be used.

[Method for Producing Optically Shaped Article]

A method for producing optically shaped articles according to the present invention is a method for producing optically shaped articles by using any of the above-described photocurable compositions for support materials for inkjet 3D printers or the above-described inks for inkjet 3D printers. The method comprises: a step for forming support materials by using the photocurable compositions for support materials for inkjet 3D printers or the inks for inkjet 3D printers; a step for forming model materials; and a step for removing the support materials.

In the method for producing optically shaped articles, known methods can be used as long as using the photocurable compositions for support materials for inkjet 3D printers or the inks for inkjet 3D printers in the step for forming support materials.

In the method for producing optically shaped articles of the present invention, the support materials, made from the photocurable compositions for support materials for inkjet 3D printers or the inks for inkjet 3D printers, have excellent curability and sufficient hardness of the cured product, and have excellent solubility in the solvent after curing. Therefore, excellent optically shaped articles can be easily produced.

EXAMPLES

Hereinafter, the present invention will be described in more detail with reference to examples, but the present invention is not limited by the following examples, and of course, it can be changed within a range that can conform to the gist of the foregoing and the following. All of them are included in the technical scope of the present invention.

Example 1

To 7 parts by mass of water and 23 parts by mass of ethylene glycol (manufactured by Nippon Shokubai Co., Ltd.), 35 parts by mass of potassium acrylate (manufactured by Nippon Shokubai Co., Ltd.) as the water-soluble ethylenically unsaturated monomer, 10 parts by mass of lactic acid (manufactured by Wako Pure Chemical Industries, Ltd.), 25 parts by mass of polyethylene glycol (PEG200, manufactured by Wako Pure Chemical Industries, Ltd.), and 0.3 parts by mass of Irgacure 2959 (manufactured by BASF Japan Ltd.) as a photopolymerization initiator were added and mixed by stirring, to obtain a composition for a support material.

Examples 2 to 16 and Comparative Examples 1 to 4

In each of Examples 2 to 16 and Comparative Examples 1 to 4, a composition for a support material was obtained in the same manner of Example 1 except that the compounds and quantities (parts by mass) were changed as shown in the following Tables 1 and 2. In Tables 1 and 2, sodium acrylate, zinc acrylate and calcium acrylate manufactured by Nippon Shokubai Co., Ltd., DMAPAA-Q (dimethylaminopropylacrylamide methyl chloride quaternary salt) manufactured by KJ Chemicals Co., Ltd., ACMO (acryloylmorpholine) manufactured by Tokyo Chemical Industry Co., Ltd., HEAA (hydroxyethyl acrylamide) manufactured by Tokyo Chemical Industry Co., Ltd., AA (acrylic acid) manufactured by Nippon Shokubai Co., Ltd., SFT70 (C12-C14 straight chain EO 7 mole adduct to secondary alcohol) manufactured by Nippon Shokubai Co., Ltd., diethylene glycol, triethylene glycol and propylene glycol manufactured by Nippon Shokubai Co., Ltd., ethylene glycol monomethyl ether manufactured by Wako Pure Chemical Industries, Ltd., dipropylene glycol manufactured by Wako Pure Chemical Industries, Ltd., glycerol manufactured by Wako Pure Chemical Industries, Ltd., PPG400 manufactured by Wako Pure Chemical Industries, Ltd., PEG600 (polyethylene glycol) manufactured by Wako Pure Chemical Industries, Ltd., Irgacure 184 manufactured by BASF Japan Ltd., and Lucirin TPO manufactured by BASF Japan Ltd. were used as commercially available products.

The compositions for support materials obtained in Examples 1 to 16 and Comparative Examples 1 to 4 were evaluated by the following evaluation methods.

(i) Appearance Evaluation

The compositions for support materials obtained in Examples 1 to 16 and Comparative Examples 1 to 4 were respectively placed in a transparent glass container having a diameter of 20 mm, and the appearance was visually evaluated. The evaluation criteria were as follows. The results are shown in Tables 1 and 2.

A: Uniform and Transparent
B: Uniform
C: Separation (ii) Odor Evaluation

Odor of the compositions for support materials obtained in Examples 1 to 16 and Comparative Examples 1 to 4 were evaluated. The evaluation criteria were as follows. The results are shown in Tables 1 and 2.

A: No irritating odor by monomers was observed.
B: Slightly irritating odor by monomers was observed.
C: Strong irritating odor by monomers was observed.

(iii) Curability Evaluation

The compositions for support materials obtained in Examples 1 to 16 and Comparative Examples 1 to 4 were irradiated with a light of 250 mJ/cm$^2$, 500 mJ/cm$^2$ or 1000 mJ/cm$^2$ to evaluate curability. The evaluation criteria were as follows. The results are shown in Tables 1 and 2.

A: The composition was cured with a light of 250 mJ/cm$^2$.
B: The composition was cured with a light of 500 mJ/cm$^2$.
C: The composition was cured with a light of 1000 mJ/cm$^2$.
D: The composition was not cured with a light of 1000 mJ/cm$^2$, and remained in a liquid state.

(iv) Solubility Evaluation

A piece (1×1×0.5 cm) of the cured product, which was cured in (iii) Curability Evaluation, of each of the compositions for support materials of Examples 1 to 16 and Comparative Examples 1, 2 and 4 was placed on a wire net, and placed in water having a water temperature of 25° C. and volume of 100 mL to evaluate solubility. The evaluation criteria were as follows. The results are shown in Tables 1 and 2.

A: The composition was dissolved in the water within 1 hour.
B: The composition was dissolved in the water within 1 hour and a half.

C: The composition was dissolved within 2 hours.
D: The composition was not dissolved within 2 hours.

(v) Supportability Evaluation

Hardness of the cured product, which was cured in (iii) Curability Evaluation, of each of the compositions for support materials (when the UV irradiation amount was 500 mJ/cm²) of Examples 1 to 16 and Comparative Examples 1, 2 and 4 was measured with Durometer E type (manufactured by Kobunshi Keiki Co., Ltd.) and evaluated. The evaluation criteria were as follows. The results are shown in Tables 1 and 2.

A: not less than 40
B: not less than 30 and less than 40
C: not less than 20 and less than 30
D: not less than 10 and less than 20
E: less than 10 (unmeasurable)

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Ionic Monomers | potassium acrylate | 35 | 25 | 31 | 25 | 15 | 12 | 15 | 10 | 15 | 17 |
| | sodium acrylate | | | | 5 | | | | | | |
| | zinc acrylate | | | | | 5 | 5 | 4 | 8 | | 5 |
| | calcium acrylate | | | | | | | | | 3 | |
| | DMAPAA-Q | | | | | | | | | | |
| Non-Ionic Monomers | ACMO | | | | | | | | | | |
| | HEAA | | | | | | | | | | |
| | AA | | | | | | | | | | |
| Others | lactic acid | 10 | 10 | 10 | 10 | | | 6 | | | |
| | SFT70 | | | | | | 5 | | | | |
| Solvents | water | 7 | 7 | 1 | 3 | | | | 9 | 8 | |
| | ethylene glycol | 23 | | 38 | | | | | 13 | 14 | |
| | diethylene glycol | | 38 | | 47 | 80 | 75 | 40 | 60 | 60 | |
| | triethylene glycol | | | | | | | | | | 3 |
| | propylene glycol | | | | | | | | | | 75 |
| | ethylene glycol monomethyl ether | | | | | | | 35 | | | |
| | dipropylene glycol | | | | | | | | | | |
| | glycerol | | | 5 | | | | | | | |
| | PEG200 | 25 | 20 | 15 | 10 | | | | | | |
| | PPG400 | | | | | | | | | | |
| | PEG600 | | | | | | | | | | |
| photopolymerization initiators | Irgacure 184 | | | | | | 0.3 | | | 0.5 | |
| | LucirinTPO | | 0.3 | | | 0.3 | | | 0.3 | | 0.5 |
| | Irgacure2959 | 0.3 | | 0.3 | 0.3 | | | 0.3 | | | |
| | Appearance | A | A | A | A | A | A | A | A | A | A |
| | Odor of Ink | A | A | A | A | A | A | A | A | A | A |
| | Curability | A | A | A | B | A | A | A | A | B | A |
| | Solubility | A | A | A | A | A | A | B | C | B | A |
| | Supportability | C | A | A | A | A | B | B | A | B | D |

TABLE 2

| | | Examples | | | | | | Comparative Examples | | | |
|---|---|---|---|---|---|---|---|---|---|---|---|
| | | 11 | 12 | 13 | 14 | 15 | 16 | 1 | 2 | 3 | 4 |
| Ionic Monomers | potassium acrylate | 31 | 15 | 12 | 13 | 12 | 15 | 35 | 25 | | |
| | sodium acrylate | | | | | | | | | | |
| | zinc acrylate | | 5 | 7 | 5 | 6 | 8 | | | | |
| | calcium acrylate | | | | | | | | | | |
| | DMAPAA-Q | | | | | | | | | | 15 |
| Non-Ionic Monomers | ACMO | | | | | | | | | 40 | 40 |
| | HEAA | | | | | | | | | | 10 |
| | AA | | 10 | | | | | | | | |
| Others | lactic acid | | | | | | | 10 | 10 | 10 | |
| | SFT70 | | | | | | | | | | |
| Solvents | water | | | 10 | | 5 | 9 | 15 | 13 | | |
| | ethylene glycol | 39 | | | | | | 15 | | 30 | |
| | diethylene glycol | | | 71 | 47 | | 28 | | 38 | | |
| | triethylene glycol | | | | | | | | | | |
| | propylene glycol | | 75 | | | | | | | | |
| | ethylene glycol monomethyl ether | | | | | 77 | | | | | |
| | dipropylene glycol | | | | | | | | | | |
| | glycerol | | 5 | | | | 40 | | | | |
| | PEG200 | 20 | | | | | | 25 | 14 | 20 | 15 |
| | PPG400 | | | | 35 | | | | | | |
| | PEG600 | | | | | | | | | | 20 |
| photopolymerization ization | Irgacure 184 | 0.8 | | | | 0.05 | | | | | |
| | LucirinTPO | | | 0.4 | | | 0.3 | | | 0.3 | 1 |

TABLE 2-continued

|  |  | Examples | | | | | | Comparative Examples | | | |
| --- | --- | --- | --- | --- | --- | --- | --- | --- | --- | --- | --- |
|  |  | 11 | 12 | 13 | 14 | 15 | 16 | 1 | 2 | 3 | 4 |
| initiators | Irgacure2959 |  | 0.3 |  | 0.3 |  |  | 0.3 |  | 0.5 |  |
|  | Appearance | A | A | A | A | A | A | A | A | A | A |
|  | Odor of Ink | B | A | A | A | A | A | A | A | C | C |
|  | Curability | A | A | B | B | A | B | C | C | D | C |
|  | Solubility | B | B | A | B | C | A | A | A | — | C |
|  | Supportability | B | B | A | A | A | A | E | E | — | D |

In all of the compositions for support materials of Examples 1 to 16, a content of the water was not more than 10 mass % with Karl Fischer titration measurement. As shown in Tables 1 and 2, the compositions for support materials, having the water content of not more than 10 mass %, had excellent curability and sufficient hardness of the cured product, and had excellent solubility in the solvent after curing.

INDUSTRIAL APPLICABILITY

According to the present invention, the photocurable composition for support materials for inkjet 3D printers, having excellent curability and sufficient hardness of the cured product, and having excellent solubility in the solvent after curing, the ink and cartridge containing thereof, the method for producing the support materials, and the method for producing optically shaped articles using the support materials, can be provided.

The invention claimed is:

1. A photocurable composition for a support material for an inkjet 3D printer comprising:
    4 to 15 mass % of zinc acrylate;
    40 to 80 mass % of a glycol comprising one selected from the group consisting of diethylene glycol, triethylene glycol, propylene glycol, ethylene glycol monomethyl ether and dipropylene glycol;
    0.1 to 1.0 mass % of a photopolymerization initiator selected from the group consisting of acetophenone compounds and phosphine oxides;
    potassium acrylate;
    optionally, a non-ionic monomer selected from the group consisting of (meth) acrylic acid, (meth) acrylates and acrylamides;
    optionally lactic acid, and
    optionally, not more than 3 mass % of water.
2. The photocurable composition of claim 1, wherein the glycol has from 2 to 6 carbon atoms.
3. The photocurable composition of claim 1, wherein the photocurable composition does not contain water.
4. The photocurable composition of claim 1, wherein the glycol further comprises one selected from the group consisting of ethylene glycol, polyethylene glycol, polypropylene glycol, glycerol, and alkylene oxide adducts containing oxypropylene groups.
5. The photocurable composition of claim 1, wherein a cured product of the photocurable composition is water-soluble.
6. The photocurable composition of claim 1, wherein the non-ionic monomer included in the photocurable composition is at a content of 9.9 mass % or less.
7. The photocurable composition of claim 6, wherein the non-ionic included in the photocurable composition is at a content of less than 2 mass %.
8. The photocurable composition of claim 1, wherein the photocurable composition consisting of:
    the zinc acrylate;
    the glycol;
    the photopolymerization initiator;
    the potassium acrylate;
    optionally, the non-ionic monomer;
    optionally, the lactic acid and/or a nonionic surfactant comprising an ethylene oxide adduct; and
    optionally, the water.
9. The photocurable composition of claim 8, wherein the glycol is selected from the group consisting of diethylene glycol, triethylene glycol, propylene glycol, ethylene glycol monomethyl ether and dipropylene glycol.
10. An ink for an inkjet 3D printer, the ink comprising the photocurable composition of claim 1.
11. A cartridge for an inkjet 3D printer, the cartridge filled with the ink of claim 10.
12. A method for producing a support material, wherein said support material is formed by using the ink of claim 10.
13. A method for producing an optically shaped article by using the ink of claim 10, the method comprising:
    a step for forming a support material by using said ink;
    a step for forming a model material on the support material; and
    a step for removing said support material.
14. A method for producing a support material, wherein said support material is formed by using the photocurable composition of claim 1.
15. A method for producing an optically shaped article by using the photocurable composition of claim 1, the method comprising:
    a step for forming a support material by using said photocurable composition;
    a step for forming a model material on the support material; and
    a step for removing said support material.

* * * * *